June 20, 1939.  R. T. COLLIER  2,163,236
BADMINTON BIRD
Filed July 29, 1938  2 Sheets-Sheet 1

INVENTOR.
Robert T. Collier
BY Robert H. Eckloff
ATTORNEY

June 20, 1939. R. T. COLLIER 2,163,236
BADMINTON BIRD
Filed July 29, 1938 2 Sheets-Sheet 2
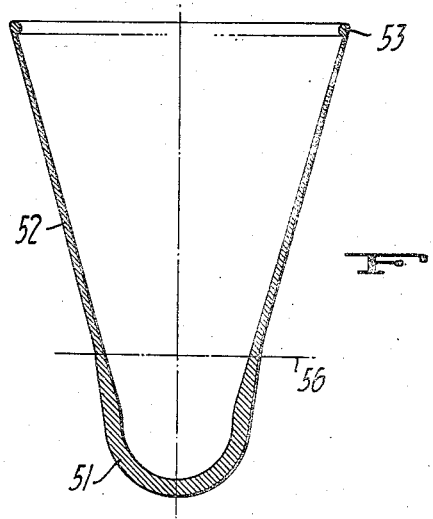
FIG_5_
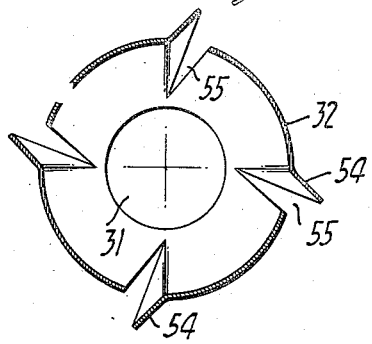
FIG_7_
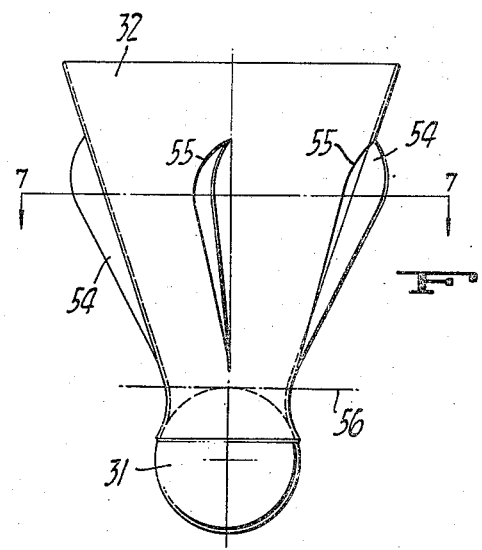
FIG_6_
INVENTOR
Robert T. Collier
BY Robert H. Eckhoff
ATTORNEY Patented June 20, 1939

2,163,236

UNITED STATES PATENT OFFICE 2,163,236

BADMINTON BIRD

Robert T. Collier, Hillsborough, Calif.

Application July 29, 1938, Serial No. 221,954

2 Claims. (Cl. 273—106)

This invention relates to an improvement in the bird or shuttlecock employed in badminton and like games, more particularly, to provision of such a game device which is free of the various objections to the present bird.

Badminton, as presently played, employs a bird or shuttle which includes a base from which extend a plurality of specially cut feathers joined together with a cord lacing. Notoriously these birds are costly and fragile. Further, although pains are taken in their manufacture, the birds vary appreciably in inherent properties (weight, center of gravity and balance) and in their actual flight characteristics, because of the inherent variation in their integral parts.

To guard against extreme brittleness the present birds must necessarily be kept in an atmosphere of controlled and constant humidity, which is bothersome and generally not done. During a game, due to the nature of the feathers, the flight character of a bird is frequently altered by a misdirected blow from a racket or paddle, so changing the speed of flight and usual trajectory of the bird as to change the speed of the game.

In accordance with this invention I provide a bird which can be manufactured by exact predetermined methods so that the birds produced are uniform. Further, I provide a bird construction which can be altered readily in manufacture so that the bird produced is suited to one type of play, thus enabling birds of predetermined and uniform characteristics to be manufactured. Thus, birds can be made with such characteristics that in play a fast game is played. Other birds can be made to give a slow game so that persons can play without extreme exertion. Likewise the construction can be made to suit birds for use outdoors and others for indoors.

It is in general the broad object of the present invention to provide an improved badminton bird, one which can be manufactured with substantially uniform characteristics, and will remain uniform during play.

Another object of the present invention is to provide a novel form of badminton bird.

Another object of the present invention is to provide a form of badminton bird which is relatively rugged and yet simple in construction, possessing the necessary characteristics common to present badminton birds.

The invention includes other objects and features of advantage some of which, together with the foregoing, will appear hereinafter wherein the present form of the badminton bird of this invention is disclosed.

In the drawings accompanying and forming a part hereof, Figure 1 is a side elevation while Figure 2 is an end elevation of the same. Figure 3 is a section through the device of Figure 1.

Figure 5 is a section through another form of bird shown as a one-piece moulded or pressed structure.

Figure 6 is a side elevation of another form of bird, while Figure 7 is a section taken along the lines 7—7 of Figure 6.

Figure 1:
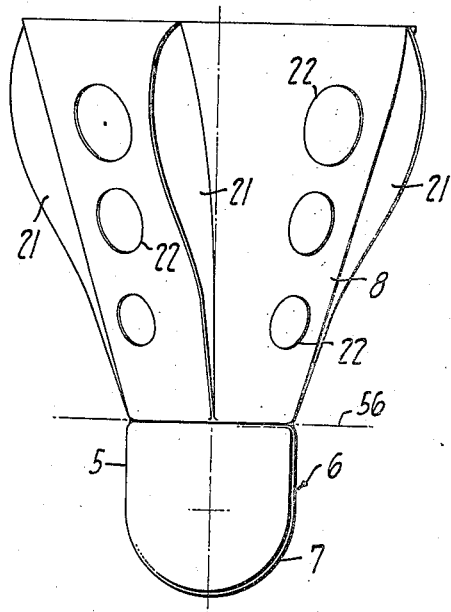

In accordance with this invention, I provide a suitable base 6. This base is shown as having a spheroidal or hemispherical end 7 and a cylindrical side wall portion 5. The end is normally engaged and struck by the racket employed in the game. Any form or style of base can be employed. Secured to the base and extending therefrom with its side flared outwardly is a member 8 shown in the drawings in the form of a hollow truncated cone. The material employed can be Celluloid or other suitable plastic or resinous material; that material successfully employed in the manufacture of ping-pong balls can be utilized to advantage, but any light, strong and more or less resilient material is useful so long as it can be formed, moulded or otherwise suitably worked. A bird formed of one of these materials is substantially unaffected by atmospheric moisture and is practically free of all the disadvantage of present birds.

Figure 3:
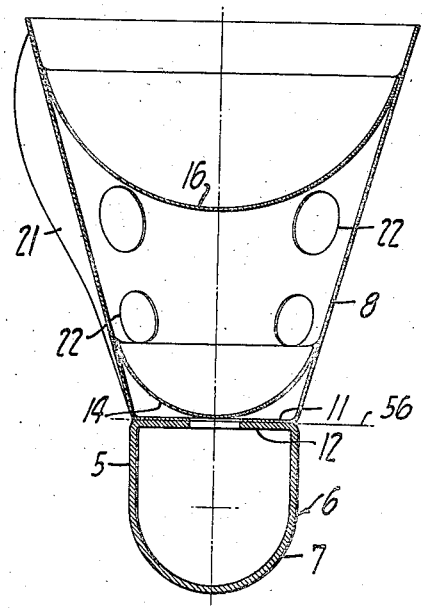
Figure 2:
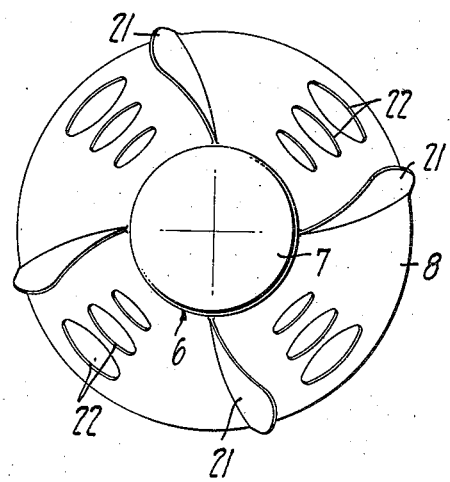

The member 8 is shown as attached directly to base 6 by a single overlapping joint. In Figure 3, I have shown flange 11 on members 8 and flange 12 on the base 6 secured together. The base can be weighted with any suitable material.

The relative masses of the base and truncated cone member are so adjusted that the center of gravity of the assembled device lies approximately on a line passing through the junction of flanges 11 and 12. For a sturdy bird, and birds subjected to very heavy service, a reinforcing member such as the spheroidal member 14 can be provided adjacent the flange 11. The position of the reinforcing member can be varied and, as is indicated at 16, this member can be provided to reinforce any position of member 8 as, for example, the upper portion of the member 8.

While the simple base-cone structure so far disclosed can be successfully employed, I prefer to provide suitable fins on member 8 to increase accuracy in controlling direction of flight of the bird. Also, to provide buoyancy and increase air resistance, I further modify the structure as will presently appear. Thus I provide flutes or fins 21 upon the side of member 8, these being formed integrally with the member 8 or suitably attached thereto. Suitable apertures 22 formed in the member reduce vacuum formed behind the member on its flight through the air and control its apparent buoyancy by reducing the vacuum drag.

It is to be noted that in Figure 1, the fins 21 are helically arranged. This imparts a rotary motion to the bird causing it to rotate in flight. The fins, in rotating the bird, slow it down slightly and cause it to "float" during flight, particularly when it is dropping toward the court or floor.

Figure 4:
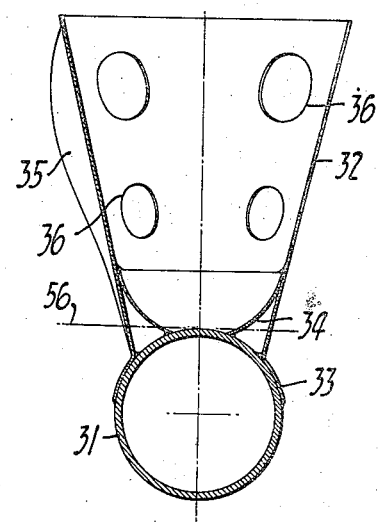
Figure 4 is a section taken through a modified form of bird.

In Figure 4 I have shown a form of device in which the base 6 is provided by a suitable sphere or ball structure 31 which can be a suitably weighted ball. Attached to the ball is a truncated cone member 32 flanged outwardly and provided with a ball-engaging portion 33 which is suitably secured to the ball. A reinforcing member 34 is provided to engage the ball and stiffen the junction of the truncated cone member with the ball. In this instance the member 32 can also be provided with suitable fins 35 and suitable apertures 36 to impart rotation to the bird as well as to decrease its air resistance.

In Figure 5 I have shown a bird construction in which the spherical base portion 51 is integral with the truncated cone portion 52, the two being moulded together and the whole structure being so tapered that it can be readily moulded, cast and drawn, or otherwise formed, in one operation. The relative thicknesses of the material are such that the bird possesses the necessary flight characteristics. To provide structural strength and rigidity, reinforcing rim 53 has been shown on the truncated cone portion 52. One or more of these can be provided as desired upon the structure. While I have omitted any showing of fins or apertures in this device, these can be provided as desired, in accordance with the teaching herein.

In Figures 6 and 7 I have shown the structure of Figure 4, slightly modified. This device includes the ball 31 to which is attached truncated cone 32. However, in this instance fins 54 are formed integrally with the cone portion and are pressed out of the cone to provide air release apertures 55. While the fins are shown as extending along the sides of the truncated cone, in a straight line between the base of the cone and its apex and at right angles to the base, the fins can be helically arranged if desired to impart rotation and slow down the bird as it falls.

In constructing the bird devices, the center of balance should be generally along the line to which numeral 56 has been applied in the drawing. The center of gravity should lie on the point of intersection of the line of balance with the longitudinal axis of symmetry of the structure so that the structure possesses the necessary flight characteristics. This can be achieved by adjusting the relative masses of the materials employed as well as by suitably weighting the ball structure or hemispherical end portion.

I claim:

1. A shuttle for badminton and the like comprising a one piece shell structure having an hemispherical end symmetrically disposed about the longitudinal axis of said shell, said shell continuously flaring outwardly about said axis substantially uniformly and symmetrically from said end to provide a head and a vane portion for said shuttle, said vane portion terminating in a rim enlarged with respect to the immediately adjacent vane portion.

2. A shuttle for badminton and the like comprising a one piece shell structure having an hemispherical end symmetrically disposed about the longitudinal axis of said shell, said shell continuously flaring outwardly about said axis substantially uniformly and symmetrically from said end to provide a substantially hollow head and a vane portion for said shuttle, said shell having a section joining said head and said vane portion of substantially uniformly decreasing cross-section, said vane portion terminating in a rim enlarged with respect to the immediately adjacent vane portion.

ROBERT T. COLLIER.